United States Patent [19]

Delescluse

[11] 4,366,300

[45] Dec. 28, 1982

[54] COMPOSITION AND PROCESS FOR THE PROTECTION OF MATERIALS AGAINST SPOTS OR STAINS

[75] Inventor: Charles L. L. Delescluse, Apremont, France

[73] Assignee: PCUK - Produits Chimiques Ugine Kuhlmann, Courbevoie, France

[21] Appl. No.: 265,941

[22] Filed: May 21, 1981

[30] Foreign Application Priority Data

Jun. 3, 1980 [FR]   France ............................... 80 12259

[51] Int. Cl.$^3$ .......................... C09D 3/81; C09D 5/14
[52] U.S. Cl. ....................................... 526/245; 106/2; 106/8; 106/10; 523/435; 523/523; 524/306; 524/322; 524/356; 524/507; 524/509; 524/520; 526/243
[58] Field of Search ................... 526/243, 245; 106/2, 106/8, 10; 260/21, 23 AR, 28.5 D; 523/435, 523; 524/306, 322, 356, 507, 509, 520

[56] References Cited

U.S. PATENT DOCUMENTS

| | | | |
|---|---|---|---|
| 2,687,963 | 8/1954 | Marshall | 106/10 |
| 2,687,964 | 8/1954 | Kennedy | 106/10 |
| 3,346,612 | 10/1967 | Hansen | 106/10 |
| 3,385,812 | 5/1968 | Brachman | 260/29.6 S |
| 3,459,696 | 8/1969 | Read | 260/28.5 D |
| 4,125,673 | 11/1978 | Roth et al. | 428/447 |
| 4,256,494 | 3/1981 | Yamamoto et al. | 260/28.5 D |

FOREIGN PATENT DOCUMENTS

| | | | |
|---|---|---|---|
| 216493 | 7/1957 | Australia | 526/243 |
| 2313987 | 1/1977 | France . | |
| 1433524 | 4/1976 | United Kingdom | 526/243 |
| 626106 | 9/1978 | U.S.S.R. | 106/8 |

*Primary Examiner*—Ronald W. Griffin
*Attorney, Agent, or Firm*—Beveridge, DeGrandi & Kline

[57] ABSTRACT

The invention relates to a composition for the protection of materials against contaminations, spots and stains.

This liquid composition comprises by weight 0.1 to 1% of at least one fluorinated resin based on acrylic or methacrylic esters of fluorinated sulfonamido-alcohol, associated or not with non-fluorinated monomers, 0.4 to 10% of at least one adjuvant selected from aminoplast resins based on melamine, thermoplastic resins and waxes, and 89 to 99.5% of at least one organic solvent.

Applied on materials such as walls, facades, monuments or sculptures in cement, bricks, concrete or stones and other construction elements, the composition according to the invention confers on the materials an excellent protection against natural or artificial contaminations.

20 Claims, No Drawings

COMPOSITION AND PROCESS FOR THE PROTECTION OF MATERIALS AGAINST SPOTS OR STAINS

The present invention relates to the protection of materials, especially walls, frontages, monuments or sculptures in or formed from cement, bricks, concrete or natural or reconstituted stones, elements used for roof coverings and construction elements of wood, plastics or metal surfaces, against spots, stains or contaminations capable of damaging or spoiling them.

The spoiling of the said materials may result from a natural process (deposits of dirty marks or stains or atmospheric dusts with eventual development of vegetable mosses, splashes of mud as such or mixed with oily spots of petroleum origin, bird droppings or other evacuations) or an artificial process (for example, unlicensed bill-sticking, inscriptions, projections or spraying of liquid paints.

It is known that fluorinated resins based on acrylates or methacrylates of fluorinated alcohols considerably modify the adhesive properties of polar or non-polar liquids. If their application in organic solution to the materials mentioned above confers on the latter some protection against natural or artificial contamination by spots or stains, this is not sufficient; the same deficiency applies to the heat-hardenable or thermoplastic resins and the waxes.

The invention therefore relates to a product whose application to the above-mentioned materials confers on them, without alteration or modification of their initial appearance, a complete protection against spotting or staining or at least to a large extent facilitates their cleaning by considerably reducing the time lost during their restoration.

According to the present invention, this result may be obtained by applying to the materials to be protected a liquid composition comprising by weight:

(A) 0.1 to 1% of at least one fluorinated resin based on an acrylic or methacrylic ester of a fluorinated sulfonamidoalcohol, associated or not with up to 80% of non-fluorinated monomers, said fluorinated sulfonamido-alcohol having the general formula:

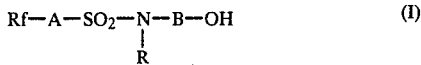

in which Rf represents a perfluoroalkyl radical, A represents a direct bond or an alkylene bridge, B represents an alkylene bridge and R represents a hydrogen atom or an alkyl, cycloalkyl, hydroxyalkyl or aryl radical;

(B) 0.4 to 10% of at least one adjuvant selected from the aminoplast resins based on melamine, thermoplastic resins and waxes; and (C) 89 to 99.5% of at least one organic solvent.

In formula (I), the perfluoroalkyl radical may be straight or branched and contain 1 to 20 (preferably 4 to 16) carbon atoms; preferably, the alkylene bridge represented by A contains 2 or 4 carbon atoms and that represented by B contains 2 to 4 carbon atoms; the alkyl radical represented by R preferably contains 1 to 10 carbon atoms, the cycloalkyl radical 5 to 12 carbon atoms and the hydroxyalkyl radical 2 to 4 carbon atoms; the aryl radical (for example phenyl) represented by R may be substituted by an alkyl radical containing 1 to 6 carbon atoms.

The fluorinated resins (A) used are preferably those which result from the polymerization of one or more acrylic or methacrylic esters of fluorinated alcohol possibly accompanied by a minor proportion, i.e., from 0 to 20% by weight, of other non-fluorinated monomers, in the presence of a homopolymer or copolymer of a non-fluorinated alkyl acrylate or methacrylate, or those which result from the polymerization of one or more non-fluorinated alkyl acrylates or methacrylates, accompanied possibly by a minor proportion, i.e., from 0 to 20% by weight, of other non-fluorinated monomers, in the presence of a homopolymer or copolymer based on an acrylic or methacrylic ester of fluorinated alcohol. The other non-fluorinated monomers which may optionally be present include alkyl, hydroxyethyl, hydroxypropyl or glycidyl acrylates or methacrylates, acrylic acid, methacrylic acid, and N-methylol-acrylamide. Among these resins described in French Pat. Nos. 2,155,133 of Oct. 8, 1971 and 2,319,668 of July 31, 1975, those are shown to be particularly interesting which are obtained by using on the one hand a non-fluorinated alkyl acrylate or methacrylate containing 1 to 20 carbon atoms in the alkyl radical and, on the other hand, an acrylic or methacrylic ester of one or more fluorinated alcohols of the general formula:

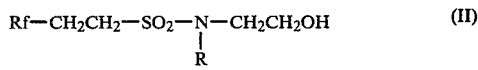

in which Rf and R have the same significances as above.

These fluorinated resins are generally obtained in the form of solutions in an inert organic solvent. These solutions can be used so that in order to obtain a composition according to the present invention, it is sufficient to add thereto the quantities of adjuvant (B) required and possibly of an organic solvent (C). The organic solvent possibly added may be the same as that in the solution of the fluorinated resin or it may be different.

As aminoplast resins based on melamine there may be mentioned more particularly the methyl or butyl ethers of hexamethylolmelamine and, preferably, the hexamethyl ether of hexamethylolmelamine. Among the compositions according to the invention, those are shown to be particularly interesting which contain 5 to 10% of aminoplast resin, this proportion being greater as the porosity of the material to be treated is higher. In order to assist the polymerization of these resins, the composition according to the invention may contain a catalyst miscible or dispersible in an organic medium, preferably lactic acid, in a proportion of 2 to 10% with regard to the weight of aminoplast resin employed.

The thermoplastic resins and the waxes, preferably employed in a proportion of 0.4 to 5%, may be used alone or, advantageously, in admixture with an aminoplast resin for treating materials having a high porosity.

The thermoplastic resins may be polyvinyl resins, especially those based on polyvinyl chloride, epoxy resins, especially those derived from bisphenol and epichlorhydrin, polyester resins which may or may not be modified, styrene resins or other alkyd copolymers, polymethyl styrenes and acrylonitrilestyrene copolymers, acrylic resins (polyacrylates or polymethacrylates, especially methyl, ethyl, butyl or cyclohexyl polymethacrylates), alkyd-urethane resins, as well as the phenol resins miscible or dispersible in an organic medium. When a reticulatable thermoplastic resin is used, for example, an epoxy resin or an acrylic resin, the composition according to the invention may possibly also contain a catalyst customarily used to assist the reticulation during the drying.

Among the waxes may be more particularly mentioned the paraffins, the paraffin oils and the stearins. At least one of these products is advantageously used when the composition according to the invention is intended for the protection of materials with a high porosity (concrete, natural or reconstituted stones, baked clays). On the other hand, their use is sometimes to be avoided when the composition according to the invention is destined for the protection of painted or unpainted metal surfaces since they can initiate corrosion phenomena. The paraffins can be used in the form of "extenders", for example the mixtures of paraffins and stearyl alcohol phosphates condensed on aluminum isopropylate (French Pat. No. 1,447,178 of Jan. 12, 1965) or mixtures of paraffins and aluminum stearates in the presence of methylcyclohexanol.

The choice of the organic solvent or solvents to be used in the compositions according to the invention depends on numerous factors, especially the type of material to be protected (smooth or porous), its state (dry or damp) at the time of application, the appearance of the surface and the desired penetration, as well as the method of application and the desired speed of drying. Chlorinated solvents can be used such as trichlorethylene, perchlorethylene and above all 1,1,1,-trichloroethane on account of its inferior toxicity, and chlorofluoro solvents such as trichloromonofluoromethane, difluorotetrachloroethanes, trifluorotrichloroethanes (preferably 1,2,2-trifluoro-1,1-2-trichloro-ethane) on account of their great speed of evaporation and their extremely low toxicity. If it is desired to increase the penetration of the compositions according to the invention on certain materials (hardwoods, plastics, certain stones), the ketones may advantageously be used, in particular methylethylketone which can also play the role of third solvent, or esters such as ethyl acetate, butyl acetate or amyl acetate. Because of the interest which they present either for their low speed of evaporation in the case for example of applications by spraying, or for their role of third solvent, aliphatic or aromatic hydrocarbons may also be used such as the gasolines, white spirit, toluene, benzene and xylene, preferably used at the rate of 5 to 50% or even more with respect to the total volume of the solvents used.

If it is desired to increase the fungal or bactericidal protection of the materials, anticryptogamic agents or bactericides can be incorporated without inconvenience in the compositions of the present invention.

The compositions according to the invention can be deposited on the materials to be protected by one or more successive layers by brushes, paint brushes, rollers or by means of spraying apparatus. The speed of drying, in the open air, depends primarily on the speed of evaporation of the solvent or solvents used. To obtain a satisfactory protection, it is generally sufficient to use 100 to 500 ml (1 ml = $10^{-6}$ m$^3$) of composition according to the invention per m$^2$ of surface to be protected, preferably 120 to 350 ml/m$^2$, so as to deposit between 0.5 to 3 g/m$^2$ of fluorinated resin (A) and 0.5 to 30 g/m$^2$ of adjuvant (B).

This small deposit on the surfact permits a better respiration of the treated materials (phenomenon of adsorption-desorption), a minimal adherence of the natural or artificial spots or stains (absence of sticking effect) and a good permanance in the time of the anti-adherence effect. Another advantage of the compositions according to the invention resides in the absence of coloration effect so that, when they are only applied on a portion of a material to be protected (for example the lower part of a wall), one cannot note demarcation between the treated portion and the untreated part.

The following examples, in which the parts and percentages indicated are by weight unless the contrary is mentioned, illustrate the invention without it being limited thereto.

EXAMPLE 1

(a) Preparation of the fluorinated resin 76 parts of 1,1,1-trichloro-ethane, 18 parts of stearyl methacrylate, 2 parts of hydroxyethyl methacrylate and 0.2 parts of lauroyl peroxide dissolved in 4 parts of 1,1,1-trichloro-ethane are introduced into a reactor. After putting the reactor under an atmosphere of nitrogen, it is heated at 74° C. for 3 hours with stirring.

Into the solution of non-fluorinated acrylic resin thus formed are introduced a mixture composed of 20 parts of an 80% solution of fluorinated acrylate of the formula:

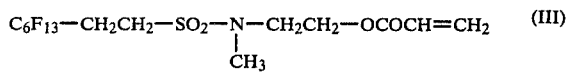

in acetone, 4 parts of stearyl methacrylate and 76 parts of 1,1,1-trichloro-ethane, then a solution of 0.2 parts of lauroyl peroxide in 4 parts of 1,1,1-trichloro-ethane and the whole is heated for 4 hours at 74° C. with stirring. After dilution with 176 parts of 1,1,1-trichloro-ethane, a solution of about 10.5% of fluorinated resin in 1,1,1-trichloro-ethane is thus obtained (hereinafter named "Solution RF$_1$").

(b) Composition according to the invention

Into a mixer are introduced successively with gentle stirring either at the ambient temperature, or preferably at 35°–40° C., the following ingredients:

| | |
|---|---|
| 1,1,1-Trichloro-ethane | 130 parts |
| Lactic acid (d = 1.21) | 1 part |
| Hexamethyl ether of hexamethylolmelamine (99 ± 1% of active materials) | 12 parts |
| Solution RF$_1$ | 4 parts |

After complete dilution of these ingredients, a composition is obtained according to the invention, in the form of a clear homogeneous liquid of density near to 1.4 containing about 0.3% of fluorinated resin, 8.1% of hexamethyl ether of hexamethylolmelamine, 90.9% of 1,1,1-trichloro-ethane and 0.7% of lactic acid.

This composition can be applied with a brush or paint brush or by spraying at the rate of 250 to 300 ml/m$^2$ on materials such as bricks, stones and concrete, the drying and the polymerization being effected in the ambient air.

Analogous compositions are obtained if the solution RF$_1$ is replaced by one of the compositions described in Examples 1 to 11 of French Pat. No. 2,319,668, supra, or by a solution of one of the products described in Examples 1 to 5 of the French Pat. No. 2,155,133, supra, on employing the same proportions of active materials.

EXAMPLE 2

Two mixtures are separately prepared having the following compositions:

| Mixture A | |
|---|---|
| 1,1,1-Trichloro-ethane | 130 parts |
| Hexamethyl ether of hexamethylolmelamine (at 99 ± 1% of active materials) | 12 parts |
| Mixture B | |
| Lactic acid (d = 1.21) | 1 part |
| Solution $RF_1$ | 4 parts |

These mixtures can be preserved for several days before their use. At the time of use, mixture B is introduced with stirring into mixture A to obtain a composition according to the invention which is applied as in Example 1.

EXAMPLE 3

The operation is as in Example 1 or 2, with the exception that the solution $RF_1$ is replaced by the same quantity of a solution prepared in the same way but by replacing the monomer of formula (III) by a mixture of fluorinated monomers of the formula:

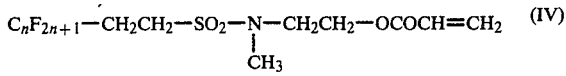

$$C_nF_{2n+1}-CH_2CH_2-SO_2-N(CH_3)-CH_2CH_2-OCOCH=CH_2 \quad (IV)$$

wherein n is equal to 4, 6, 8, 10, 12, 14 and 16 in the ratios of average and respective weight of 1:50:31:10:3:1:1.

The composition according to the invention thus obtained has properties analogous to those of Example 1 and can be applied in the same way.

EXAMPLE 4

The operation is as in Example 1, but the fluorinated resin used is a copolymer based on the fluorinated monomer of formula V (57–60%), octadecyl methacrylate (27%), hexadecyl methacrylate (8.5%) and other methacrylates of non-fluorinated alcohols in $C_{14}$, $C_{16}$ and $C_{20}$ (3–6%).

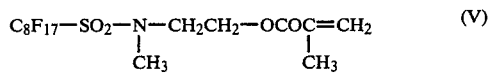

$$C_8F_{17}-SO_2-N(CH_3)-CH_2CH_2-OCOC(CH_3)=CH_2 \quad (V)$$

EXAMPLE 5

The following ingredients are successively introduced in a mixer with gentle stirring and at 35°–40° C.:

| | |
|---|---|
| 1,1,1-Trichloro-ethane | 115 parts |
| White spirit (less than 5% of aromatic compounds) | 15 parts |
| Catalyst containing 70% of ethanol, 15% of ethyleneglycol and 15% of hydrochloric acid (d = 1.18) | 1 part |
| Hexamethyl ether of hexamethylolmelamine (at 99 ± 1% of active materials) | 9 parts |
| Solution $RF_1$ | 6 parts |

After complete dilution of these ingredients, a composition is obtained according to the invention, in the form of a clear homogeneous liquid, containing about 0.4% of fluorinated resin, 6.2% of the hexamethyl ether of hexamethylolmelamine, 82.5% of 1,1,1-trichloroethane and 10.2% of white spirit.

This composition can be applied at the rate of 250 to 300 ml/m² on different materials, notably on corks and wood agglomerates.

EXAMPLE 6

The following ingredients are successively introduced into a mixer:

| | |
|---|---|
| Perchlorethylene | 170 parts |
| Solution of polystyrene at 40% of active materials in perchloroethylene | 2 parts |
| Solution $RF_1$ | 7 parts |

After complete dilution a composition is obtained according to the invention, in the form of a liquid stable on storage, containing about 0.4% of fluorinated resin, 0.45% of polystyrene, 95.65% of perchloroethylene and 3.5% of 1,1,1-trichloro-ethane.

This composition, principally intended for the protection of elements based on natural or reconstituted stones (flat basins, jardinieres, statues), can be applied to these elements with a brush in one or two layers at the rate of 150 to 300 ml/m² according to the degree of protection desired.

The elements thus protected possess a better behavior in frosty weather owing to their smaller absorption of humidity; the natural contaminations become incrusted thereon less easily and can be removed by a simple brushing with cold water. The presence of polystyrene in the composition confers on the facing a better adherence and an excellent stability.

EXAMPLE 7

The following ingredients are successively introduced into a mixer with stirring and at the ambient temperature:

| | |
|---|---|
| 1,1,1-Trichloro-ethane | 90 parts |
| Benzene or toluene | 50 parts |
| 35% solution of polyvinyl chloride in cyclohexanone | 5 parts |
| Solution $RF_1$ | 10 parts |

After complete dilution a composition according to the invention is obtained containing about 0.7% of fluorinated resin, 1.1% of polyvinyl chloride, 63.8% of 1,1,1-trichloro-ethane, 32.3% of benzene and 2.1% of cyclohexanone, intended more particularly for the protection of porous materials exposed to the weather and used, for example, for the coating of roofs: bituminous slates, shingles, clay tiles. The application is carried out with a roller or by spraying at the rate of 250 to 300 ml/m².

When compared to the application of the fluorinated resin alone, a reinforcement of the water-repellent effect and a less penetration is noted with the product of the present invention, whence an increase of the surface protection; the picking up of atmospheric dusts is less and the development of vegetable mosses is found to be much reduced, even on faces with northern exposure.

EXAMPLE 8

The operation is as in the preceding Examples from the following ingredients:

| | |
|---|---|
| Methylethylketone | 15 parts |
| Solution at 50% of methyl polymethacrylate in methylethylketone | 10 parts |
| 1,1,1-Trichloro-ethane | 120 parts |
| Hexamethyl ether of hexamethylolmelamine (at 99 ± 1% of active materials) | 10 parts |
| Solution RF₁ | 15 parts |

The composition according to the invention thus obtained which contains about 0.9% of fluorinated resin, 2.9% of methyl polymethacrylate, 5.9% of the hexamethyl ether of hexamethylolmelamine, 11.8% of methylethylketone and 78.5% of 1,1,1-trichloro-ethane, is present in the form of a homogeneous liquid which is applied on the materials to be protected at the rate of 170 to 250 ml/m².

EXAMPLE 9

The operation is as in the preceding Examples from the following ingredients:

| | |
|---|---|
| White spirit (less than 5% of aromatic compounds) | 80 parts |
| 75% solution of an alkyd resin (68% of fatty acid of tall-oil) in white spirit | 5 parts |
| Solution RF₁ | 5 parts |

The composition according to the invention thus obtained contains about 0.6% of fluorinated resin, 4.1% of alkyd resin, 90.3% of white spirit and 5% of 1,1,1-trichloro-ethane, and is applied at the rate of 120 to 200 ml/m² on the materials to be protected.

EXAMPLE 10

With gentle stirring, the following ingredients are successively mixed:

| | |
|---|---|
| Xylene | 90 parts |
| 35% solution of an unsaturated polyester resin, prepared from a 60/40 mass of polyester/styrene with a 50/50 mixture of xylene and ethyl acetate | 8 parts |
| Solution RF₁ | 5 parts |

A composition according to the invention is obtained containing about 0.5% of fluorinated resin, 2.5% of polyester-90% of xylene, 2.6% of ethyl acetate and 4.4% of 1,1,1-trichloro-ethane.

EXAMPLE 11

The following ingredients are mixed successively with moderate stirring and at the ambient temperature or preferably at 33°-40° C.:

| | |
|---|---|
| 1,1,1-Trichloro-ethane | 120 parts |
| Crude paraffin (melting point: 35° C.) | 8 parts |
| Hexamethyl ether of hexamethylolmelamine (at 99 ± 1% of active materials) | 10 parts |
| Solution RF₁ | 4 parts |
| Trichloromonofluoromethane | 40 parts |

A composition according to the invention is obtained containing about 0.2% of fluorinated resin, 4.4% of paraffin, 5.5% of the hexamethyl ether of hexamethylolmelamine, 67.9% of 1,1,1-trichloro-ethane and 22% of trichloromonofluoromethane, in the form of a homogeneous liquid which is applied at the rate of 200 to 300 ml/m² for the protection of concrete, stones, or bricks.

EXAMPLE 12

The compositions according to the invention described in Examples 1, 2 and 11 (hereinafter denoted compositions 1, 2 or 11) are applied to a wall constituted of plates or slabs of reinforced concrete, in comparison with compositions A, B, C and D, which do not conform to the present invention, prepared in the same way from the ingredients indicated in the following Table 1 (p=parts).

TABLE 1

| | Composition | | | |
|---|---|---|---|---|
| Ingredients | A | B | C | D |
| 1,1,1-Trichloro-ethane | 130 p | 130 p | 120 p | 120 p |
| Crude paraffin (m.p.: 35° C.) | — | — | 8 p | — |
| Solution RF₁ | 4 p | — | — | 4 p |
| Lactic acid (d = 1.21) | — | 1 p | — | — |
| Hexamethyl ester of hexamethylolmelamine (99 ± 1%) | — | 12 p | 10 p | — |
| Trichloromonofluoromethane | — | — | 40 p | 40 p |

Compositions 1, 2, 11, A, B, C, and D are applied with a paint roller in two layers at the rate of 175 ml/m² for the first and 125 ml/m² for the second, with a period of intermediate drying of 3 hours. After the application of the second layer, it is left to dry in the ambient air for 24 hours, then the efficiency of the treatment and the protection of the concrete against unlicensed poster-sticking is determined.

For this purpose, the different portions of wall treated have been sized by means of adhesives based on methylcellulose and carboxymethylcellulose generally employed for sticking advertisement posters and bills. Three commercial adhesives have been separately tested.

Adhesive REMY in aqueous solution at 70 g/l
Adhesive QUELYD in aqueous solution at 70 g/l
Maxi adhesive GP in aqueous solution at 50 g/l Operation was by the usual method followed by bill posters, namely: regular pasting of the concrete support by means of a brush soaked with adhesive, then fixing the bill or poster and finally brushing the whole surface of the poster with the brush soaked with adhesive.

The ease of removal of the poster after 24 hours drying is estimated on the one hand by tests of removal when dry (tentative pulling off of the dry poster), on the other hand by tests of removal in the damp state (superficial rewetting of the poster by sprinkling with water, leaving for 15 minutes, then tentative pulling off). The ease of removal of a rectangular poster (1 m × 0.6 m) has been numbered as follows:

1—very easy pulling off (less than 20 seconds for complete removal of the poster)
2—easy pulling off (20 to 40 seconds)
3—moderately easy pulling off (3 to 6 minutes)
4—difficult pulling off (6 to 15 minutes)
5—very difficult to pull off (15 to 30 minutes)
6—complete pulling off practially impossible (tearing in thickness of the poster)

The following Table 2 collects the results obtained.

TABLE 2

| | REMY adhesive Pulling off | | QUELYD adhesive Pulling off | | MAXI adhesive GP Pulling off | |
|---|---|---|---|---|---|---|
| Composition | DRY | DAMP | DRY | DAMP | DRY | DAMP |
| None (untreated | | | | | | |

TABLE 2-continued

| Composition | REMY adhesive Pulling off | | QUELYD adhesive Pulling off | | MAXI adhesive GP Pulling off | |
|---|---|---|---|---|---|---|
| | DRY | DAMP | DRY | DAMP | DRY | DAMP |
| wall) | 5 | 3 | 5 | 3 | 6 | 2-3 |
| A | 2-3 | 3 | 2-3 | 3 | 3 | 3-4 |
| B | 5 | 4-5 | 5 | 4-5 | 5 | 5 |
| C | 2 | 2-3 | 3 | 2-3 | 4 | 4-5 |
| D | 2-3 | 3 | 2 | 2-3 | 2-3 | 3-4 |
| 1 | 1 | 1 | 1 | 1 | 1-2 | 1-2 |
| 2 | 1 | 1-2 | 1 | 1-2 | 1-2 | 1-2 |
| 11 | 1 | 1 | 1 | 1 | 1-2 | 1-2 |

These results show that the compositions according to the invention confer on the supports an excellent anti-adherence effect, superior to that of compositions A, B, C and D corresponding to the elements of the compositions claimed used separately.

EXAMPLE 13

Compositions 1, 2, 11, A, B, C and D as defined above were applied to metal walls consisting of metal plates coated with a paint with an aluminum powder base. The application of the compositions was effected by spraying in two layers with intermediate drying in the ambient air, so as to deposit altogether 250 ml of composition per m² of surface to be protected.

The pulling off tests were effected as in Example 12 with the same adhesives and after a drying of 24 hours in the ambient air.

The following Table 3 shows the collected results observed in relation to the facility of pulling off the posters.

TABLE 3

| Composition | REMY adhesive Pulling off | | QUELYD adhesive Pulling off | | MAXI adhesive GP Pulling off | |
|---|---|---|---|---|---|---|
| | DRY | DAMP | DRY | DAMP | DRY | DAMP |
| None (untreated wall) | 6 | 5 | 6 | 5 | 6 | 6 |
| A | 2-3 | 3 | 2-3 | 3 | 3 | 3 |
| B | 5 | 4 | 5-6 | 4-5 | 6 | 6 |
| C | 3 | 2-3 | 3 | 3 | 3-4 | 4 |
| D | 3 | 3 | 2-3 | 3 | 3 | 3 |
| 1 | 1 | 1 | 1 | 1 | 2 | 2 |
| 2 | 1 | 1 | 1 | 1 | 2 | 2 |
| 11 | 1 | 1 | 1 | 1 | 2 | 2 |

The best performances are obtained with the compositions 1, 2 and 11 according to the invention.

EXAMPLE 14

On a fully exposed east-facing part of the wall of a cottage faced with a coating of smooth mortar and covered for more than a year with a paint based on an emulsion of acrylic derivatives, composition 11 is applied with a paint roller in two successive layers with intermediate drying in the ambient air, so as to deposit at each layer 150 ml/m².

On two other parts of the same wall compositions C and D are applied in the same way.

It is found that composition 11 according to the invention confers on this wall, habitually soiled by the droppings of swallows which construct their nests under the cornices of the roof, an excellent protection; one sprinkling with a jet of water is sufficient to remove the contamination although with compositions C and D an energetic brushing is necessary to restore the wall to a fit state.

The above-cited French Pat. Nos. 1,447,178 and 2,155,133 correspond to U.S. Pat. Nos. 3,454,420 and 3,870,767 respectively, which both are incorporated by reference herein. Similarly, the above-cited French Pat. No. 2,319,668 corresponds to British Pat. No. 1,543,084 which both are incorporated by reference in their entireties herein.

What is claimed is:

1. A substantially non-aqueous liquid composition for the protection of materials against comtaminations from spots and stains, which consists by weight of:
   (A) 0.1 to 1% of at least one fluorinated resin based on an acrylic or methacrylic ester of a fluorinated sulfonamide-alcohol and containing from 0 to 80% non-fluorinated monomers, said fluorinated sulfonamide-alcohol having the formula:

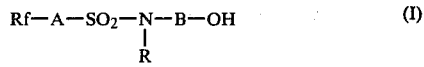

$$Rf-A-SO_2-N(R)-B-OH \quad (I)$$

in which Rf represents a perfluoroalkyl radical, A represents a direct bond or an alkylene bridge, B represents an alkylene bridge and R represents a hydrogen atom or an alkyl, cycloalkyl, hydroxyalkyl or aryl radical;
   (B) 0.4 to 10% of at least one adjuvant selected from aminoplast resins based on melamine, polyvinyl resins, epoxy resins, polyester resins, styrene resins, alkyd-urethane resins, phenolic resins and waxes; and
   (C) 89 to 99.5% of at least one organic solvent.

2. Composition according to claim 1 in which the fluorinated resin (A) results from the polymerization of one or more acrylic or methacrylic esters of fluorinated alcohol of formula (I), accompanied by from 0 to 20% of other non-fluorinated monomers, in the presence of a homopolymer or copolymer of non-fluorinated alkyl acrylate or methacrylate.

3. Compositions according to claim 1 in which the fluorinated resin (A) results from the polymerization of one or more non-fluorinated alkyl acrylates or methacrylates, accompanied by from 0 to 20% of other non-fluorinated monomers, in the presence of a homopolymer or copolymer based on acrylate or methacrylate esters of the fluorinated alcohol of formula (I).

4. Composition according to claim 2 in which the alkyl radical of the non-fluorinated alkyl acrylates or methacrylates contains 1 to 20 carbon atoms.

5. Composition according to claim 3 in which the alkyl radical of the non-fluorinated alkyl acrylates or methacrylates contains 1 to 20 carbon atoms.

6. Composition according to claim 1, 2, 3, 4 or 5 in which the fluorinated alcohol corresponds to the formula:

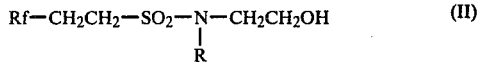

$$Rf-CH_2CH_2-SO_2-N(R)-CH_2CH_2OH \quad (II)$$

in which Rf represents a straight or branched perfluoroalkyl radical containing 1 to 20 carbon atoms and R represents a hydrogen atom, an alkyl radical containing 1 to 10 carbon atoms, a cycloalkyl radical containing 5 to 12 carbon atoms, an hydroxyalkyl radical containing 2 to 4 carbon atoms, an unsubstituted aryl radical, or an aryl radical substituted by an alkyl radical containing 1 to 6 carbon atoms.

7. Composition according to claim 1, 2, 3, 4 or 5 in which adjuvant (B) is the hexamethyl ether of hexamethylolmelamine.

8. Composition according to claim 6 in which adjuvant (B) is the hexamethyl ether of hexamethylolmelamine.

9. Composition according to claim 1, 2, 3, 4 or 5 wherein adjuvant (B) is a thermoplastic resin selected from the polyvinyl resins, epoxy resins, polyester resins, styrene resins, acrylic resins, alkyd-urethane resins and phenolic resins.

10. Composition according to claim 8 wherein one more adjuvant (B) is present which is a thermoplastic resin selected from the polyvinyl resins, epoxy resins, polyester resins, styrene resins, acrylic resins, alkyd-urethane resins and phenolic resins.

11. Composition according to claim 1, 2, 3, 4 or 5 wherein adjuvant (B) is a wax selected from the paraffins, paraffin oils and stearins.

12. Composition according to claim 8 wherein one more adjuvant (B) is present which is a wax selected from the paraffins, paraffin oils and stearins.

13. Composition according to claim 1, 2, 3, 4 or 5 which comprises in addition an organic catalyst miscible or dispersible in organic medium.

14. Composition according to claim 8 which comprises in addition an organic catalyst miscible or dispersible in organic medium.

15. Composition according to claim 1, 2, 3, 4 or 5 in which organic solvent (C) is selected from chlorinated solvents, chlorofluorinated solvents, ketones, esters, aliphatic or aromatic hydrocarbons and mixtures thereof.

16. Process for the protection of materials against contamination and spots or stains in which a composition according to claim 1, 2, 3, 4 or 5 is applied to the materials at the rate of 100 to 500 ml of composition per $m^2$ of surface to be protected.

17. Process for the protection of materials against contamination and spots or stains in which a composition according to claim 10 is applied to the materials at the rate of 100 to 500 ml of composition per $m^2$ of surface to be protected.

18. Process for the protection of materials against contamination and spots or stains in which a composition acccording to claim 12 is applied to the materials at the rate of 100 to 500 ml of composition per $m^2$ of surface to be protected.

19. Process for the protection of materials against contamination and spots or stains in which a composition according to claim 14 is applied to the materials at the rate of 100 to 500 ml of composition per $m^2$ of surface to be protected.

20. The process according to claim 16 in which said composition is applied at the rate of 120 to 350 $ml/m^2$.

* * * * *